United States Patent
Ooi

(10) Patent No.: US 9,552,037 B2
(45) Date of Patent: Jan. 24, 2017

(54) SWITCHING A COMPUTING DEVICE FROM A LOW-POWER STATE TO A HIGH-POWER STATE

(75) Inventor: Leng Ooi, San Jose, CA (US)

(73) Assignee: Google Inc., Mountain View, CA (US)

( * ) Notice: Subject to any disclaimer, the term of this patent is extended or adjusted under 35 U.S.C. 154(b) by 384 days.

(21) Appl. No.: 13/454,003

(22) Filed: Apr. 23, 2012

(65) Prior Publication Data

US 2015/0205342 A1    Jul. 23, 2015

(51) Int. Cl.
*G06F 1/26* (2006.01)
*G06F 21/00* (2013.01)
*G06F 1/32* (2006.01)
*G10L 17/00* (2013.01)
*G06F 3/06* (2006.01)

(52) U.S. Cl.
CPC .............. *G06F 1/3206* (2013.01); *G06F 3/06* (2013.01); *G06F 21/00* (2013.01); *G10L 17/00* (2013.01); *G06F 1/3231* (2013.01)

(58) Field of Classification Search
CPC ........... G06F 21/31; G06F 21/81; G06F 1/26; G06F 1/32; G06F 1/3203; G06F 1/3231; G06F 15/00
USPC ................................................. 713/300, 320
See application file for complete search history.

(56) References Cited

U.S. PATENT DOCUMENTS

| | | | | |
|---|---|---|---|---|
| 4,837,830 A * | 6/1989 | Wrench, Jr. | ............. | G10L 17/00 704/238 |
| 4,879,747 A * | 11/1989 | Leighton et al. | ............. | 713/186 |
| 5,794,058 A * | 8/1998 | Resnick | ........................ | 713/323 |
| 5,878,264 A * | 3/1999 | Ebrahim | ............... | G06F 1/3203 713/323 |
| 5,983,186 A * | 11/1999 | Miyazawa | .............. | G10L 15/26 704/233 |
| 6,370,233 B1 * | 4/2002 | Bennett, III | ........... | H04M 11/04 379/37 |
| 7,434,251 B2 * | 10/2008 | Ooi et al. | ......................... | 726/9 |
| 8,230,246 B1 * | 7/2012 | Sharkey | ........................ | 713/320 |
| 8,250,387 B2 * | 8/2012 | Tsukamoto et al. | .......... | 713/300 |
| 8,322,609 B2 * | 12/2012 | Hashimoto | ................... | 235/382 |
| 8,340,975 B1 * | 12/2012 | Rosenberger | ........... | G10L 15/22 704/270 |
| 8,359,001 B2 * | 1/2013 | Zohar | ............... | H04M 1/72522 455/404.2 |

(Continued)

OTHER PUBLICATIONS

Fritz Ron, Voice Activation in Home Automation Systems, Jan. 12, 2012, https://web.archive.org/web/20120112204251/http://compnetworking.about.com/od/homeautomationsystems/a/voice-activation-in-home-automation-systems.htm.*

(Continued)

*Primary Examiner* — Mark Connolly
(74) *Attorney, Agent, or Firm* — McDermott Will & Emery LLP

(57) ABSTRACT

Systems and methods for switching a computing device from a low-power state to a high-power state are provided. In some aspects, a method, implemented on a power management processing unit of the computing device, includes receiving, while the computing device is in the low-power state, a first audio signal. The method also includes verifying the first audio signal based on an audio signal key. The method also includes providing, in response to verifying the first audio signal, instructions for switching the computing device from the low-power state to the high-power state.

20 Claims, 3 Drawing Sheets

(56) References Cited

U.S. PATENT DOCUMENTS

| | | | | |
|---|---|---|---|---|
| 8,554,831 B2* | 10/2013 | Santori et al. | ................ | 709/203 |
| 8,756,445 B2* | 6/2014 | Walsh | .................... | G06F 1/266 |
| | | | | 713/323 |
| 2006/0253716 A1* | 11/2006 | Dhiman et al. | ............... | 713/300 |
| 2007/0079161 A1* | 4/2007 | Gupta | ........................... | 713/324 |
| 2007/0250920 A1* | 10/2007 | Lindsay | ............................ | 726/7 |
| 2009/0077404 A1* | 3/2009 | Herring et al. | .............. | 713/323 |
| 2010/0299720 A1* | 11/2010 | John et al. | ........................ | 726/3 |
| 2013/0290762 A1* | 10/2013 | Pawar | .......................... | 713/323 |
| 2014/0006825 A1* | 1/2014 | Shenhav | ....................... | 713/323 |
| 2014/0013141 A1* | 1/2014 | Heo et al. | ..................... | 713/323 |
| 2014/0358535 A1* | 12/2014 | Lee | ........................ | G10L 15/22 |
| | | | | 704/233 |
| 2015/0221307 A1* | 8/2015 | Shah | ........................ | G06F 3/16 |
| | | | | 704/253 |

OTHER PUBLICATIONS

Berenguel, Whistle control your computer (Linux&Mac), Sep. 23, 2009, http://www.mostlymaths.net/2009/09/whistle-control-your-computer.html.*

Pott, Whistle to control your computer, Jun. 25, 2007, http://lifehacker.com/271755/whistle-to-control-your-computer.*

* cited by examiner

SWITCHING A COMPUTING DEVICE FROM A LOW-POWER STATE TO A HIGH-POWER STATE

FIELD

The subject technology generally relates to power management in computing devices and, in particular, relates to switching a computing device from a low-power state to a high-power state.

BACKGROUND

Many computing devices include multiple power states. In an off state, the computing device is completely powered off; in a low-power state a display a display and/or audio output of the device may be disabled, but may be configured to be enabled quickly if an input (e.g., a button press) is received; and in a high power state the display and/or audio output of the device may be active. To switch from a low-power state to a high-power state, a user of the device may need to press a button.

SUMMARY

The disclosed subject matter relates to a method, implemented on a power management processing unit of a computing device, for switching the computing device from a low-power state to a high-power state. The method includes receiving, while the computing device is in the low-power state, a first audio signal. The method also includes verifying the first audio signal based on an audio signal key. The method also includes providing, in response to verifying the first audio signal, instructions for switching the computing device from the low-power state to the high-power state.

The disclosed subject matter further relates to a power management processing unit of a computing device configured to switch the computing device from a low-power state to a high-power state. The power management processing unit includes input logic for receiving, while the computing device is in the low-power state, a motion signal detected via a motion sensor. The power management processing unit also includes output logic for providing, in response to the motion signal, instructions for switching the computing device from the low-power state to the high-power state.

The disclosed subject matter further relates to a power management processing unit of a computing device configured to switch the computing device from a low-power state to a high-power state. The power management processing unit includes input logic for receiving, while one or more processors external to the power management processing unit are powered off, a first audio signal. The power management processing unit also includes verification logic for verifying the first audio signal based on an audio signal key. The power management processing unit also includes output logic for providing, in response to verifying the first audio signal, to a power controller of the computing device, instructions for powering on the one or more processors external to the power management processing unit.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
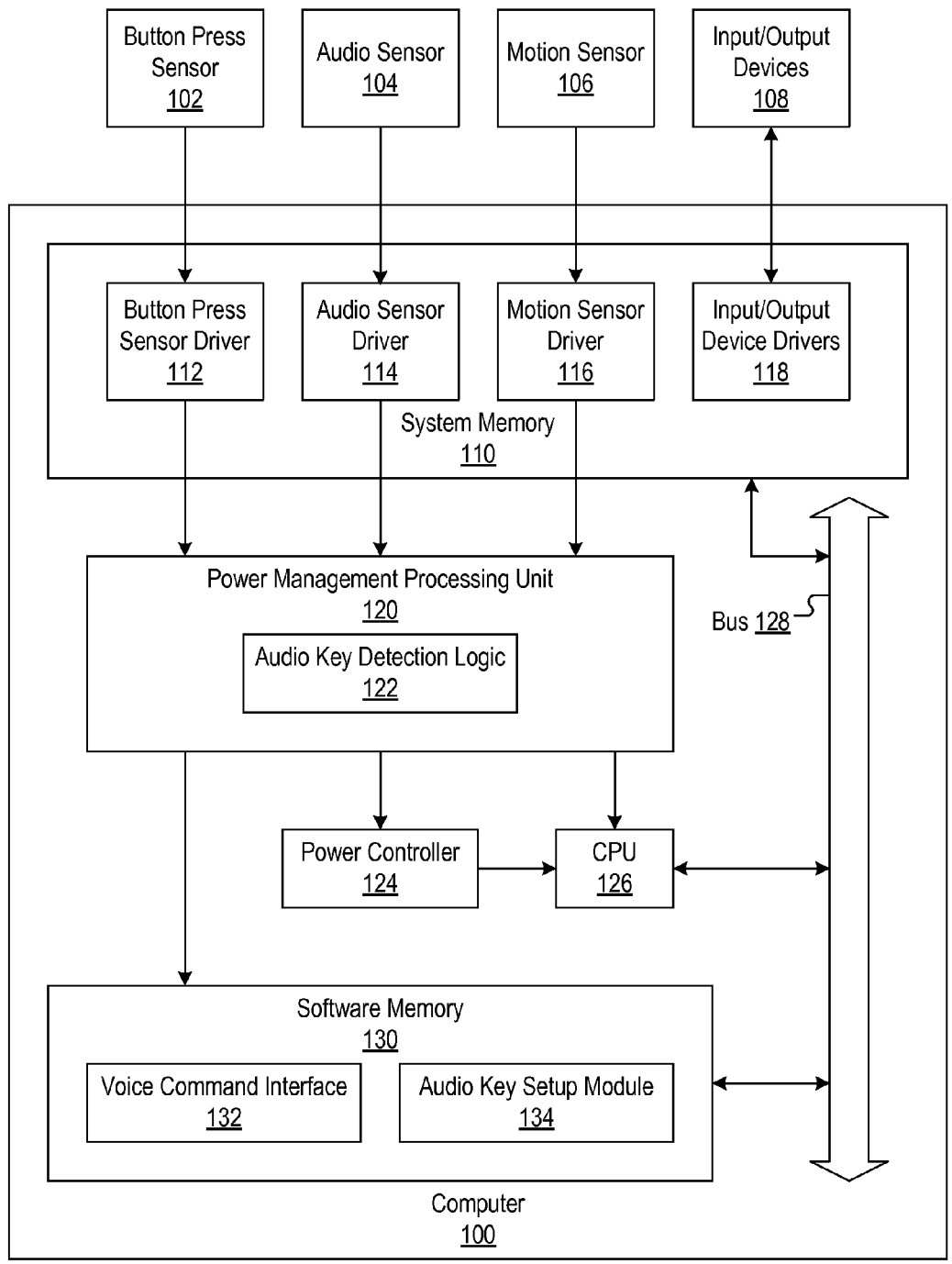
FIG. 1 illustrates an example computer configured to switch from a low-power state to a high-power state.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, a user may switch a computing device from a low-power state to a high-power state by pressing a button on the computing device. However, pressing a button may not be intuitive for a user or may not feel natural when interacting with a device that implements a voice command interface. Furthermore, pressing a button on the device may be difficult when the user's hands and eyes are occupied with other tasks, for example, when the user is driving. As the foregoing illustrates, a new approach for switching a computing device from a low-power state to a high-power state may be desirable.

The subject technology is related to switching a computing device from a low-power state to a high-power state. In example aspects, a power management processing unit of the computing device receives, while the computing device is in the low-power state, a first audio signal. For example, the first audio signal may be the word, "Abracadabra," spoken in the voice of the user of the computing device. The power management processing unit may verify the first audio signal based on an audio signal key stored in association with the power management processing unit. The audio key may be a stored indication of the word, "Abracadabra," spoken in the voice of the user of the computing device. The power management processing unit may provide instructions (e.g., to a power controller of the computing device) for switching the computing device from the low-power state to the high-power state in response to verifying the first audio signal.

As used herein, the phrase "low-power state" encompasses its plain and ordinary meaning including, but not limited to, a state when one or more first processor(s) (e.g., a central processing unit) on the computing device is powered off while one or more second processors (e.g., a power management processing unit) on the computing device are powered on. For example, a mobile phone that is turned on but is not providing information on its screen or through its audio output (e.g., when the mobile phone has not been used for a certain time period, for example, one hour) is in a low-power state. In the high-power state, the one or more first processors (e.g., the central processing unit) on the computing device are powered on. For example, in the high-power state, the mobile phone may be running an application and providing visual or audio output from the application to the user.

Advantageously, in some implementations of the subject technology, a user may be able to cause a computing device (e.g., a computing device with a voice command interface) to switch from a low-power state to a high-power state in an intuitive manner that does not require the user to remove his/her attention from other tasks (e.g., driving).

FIG. 1 illustrates an example computer 100 configured to switch from a low-power state to a high-power state. The computer 100 may be a laptop computer, a desktop computer, a mobile phone, a tablet computer, a personal digital assistant, a digital audio player, a television with one or more processors and a memory coupled thereto, a set top box for a television, or any other computing device.

As shown, the computer 100 is coupled to a button press sensor 102, an audio sensor 104, a motion sensor 106, and one or more input/output devices 108. The computer 100 includes a system memory 110, a power management processing unit 120, a power controller 124, a central processing unit (CPU) 126, a bus 128, and a software memory 130.

The button press sensor 102 is configured to detect pressure being applied to one or more buttons (e.g., a user pressing the one or more buttons). The one or more buttons may be points on a touch screen, a single home or power button, or one or more buttons on a keyboard. Upon detecting the one or more buttons being pressed, the button press sensor 102 may provide information representing the one or more buttons being pressed to the system memory 110 of the computer 100. The button press sensor 102 may reside within the computer 100. Alternatively, the button press sensor 102 may be coupled to the computer 100, e.g., via a wired connection.

The audio sensor 104 is configured to detect sound waves in the environment of the audio sensor 104. The audio sensor 104 may include a microphone. The sound waves may include any sound waves existing in the environment, for example, tones, human speech, street noise, white noise, etc. Upon detecting sound waves, the audio sensor 104 may provide information representing the detected sound waves to the system memory 110 of the computer 100. The audio sensor 104 may reside within the computer 100. Alternatively, the audio sensor 104 may be coupled to the computer 100, e.g., via a wired connection.

The motion sensor 106 is configured to detect movement in the environment of the motion sensor 106. The movement may be any movement existing in the environment, for example, a human walking or waving his/her arms. Upon detecting movement, the motion sensor 106 may provide information representing the detected movement to the system memory 110 of the computer 100. The motion sensor 106 may reside within the computer 100. Alternatively, the motion sensor 106 may be coupled to the computer 100, e.g., via a wired connection.

The computer 100 may be associated with one or more input/output devices 108, for example, a keyboard, a mouse, a display, a touch screen, a speaker, a camera, a network interface, etc. The button press sensor 102, audio sensor 104, and motion sensor 106 may be among the input/output devices 108. The input/output devices may be configured to receive input for processing by the computer 100 or provide output from the computer 100. The input/output devices 108 may reside within the computer 100. Alternatively, the input/output devices may be coupled to the computer 100, e.g., via a wired or wireless connection.

The computer 100 includes a system memory 110. The system memory includes a button press sensor driver 112, an audio sensor driver 114, a motion sensor driver 116, and input/output device drivers 118.

The button press sensor driver 112 includes instructions for the computer 100 to interface with the button press sensor 102, i.e., for the computer 100 to receive and process the information provided to the computer 100 by the button press sensor 102. Specifically, the button press sensor driver 112 may inform the computer 100 when a button associated with the button press sensor 102 has been pressed.

The audio sensor driver 114 includes instructions for the computer 100 to interface with the audio sensor 104, i.e., for the computer 100 to receive and process the information provided to the computer 100 by the audio sensor 104. Specifically, the audio sensor 104 may inform the computer 100 of sound waves in the environment of the audio sensor 104 so that the computer 100 can respond to the sound waves, for example, by recording the sound waves or causing execution of software in response to the sound waves.

The motion sensor driver 116 includes instructions for the computer 100 to interface with the motion sensor 106, i.e., for the computer 100 to receive and process the information provided to the computer 100 by the motion sensor 106. Specifically, the motion sensor 106 may inform the computer 100 of movement in the environment of the motion sensor 106 so that the computer can respond to the movement, for example, by causing execution of software in response to the movement.

The input/output device drivers 118 include instructions for the computer 100 to interface with the input/output devices 108. For example, the input/output device drivers 118 may include instructions for receiving and processing input from the input devices 108 and/or providing output for visual display and/or audio playback via the output devices 108.

The subject technology may be implemented in conjunction with all or a portion of the sensors 102, 104, and 106, and the sensor drivers 112, 114, and 116, described above. For example, a mobile phone may have a button press sensor 102 and an audio sensor 104, but no motion sensor 106 or motion sensor driver 116. Alternatively, a desktop computer may be coupled to a motion sensor 106, but the desktop computer may lack an audio sensor 104 and audio sensor driver 114. In some implementations, a computing device may include all three sensors 102, 104, and 106, and corresponding sensor drivers 112, 114, and 116.

The power management processing unit 120 includes one or more processors configured to control power usage in the computer 100 by providing instructions to the power controller 124. The power management processing unit may be a peripheral processing unit (PPU) that is separate and distinct from the central processing unit (CPU) 126.

In some example aspects, the power management processing unit 120 is configured to receive, while the computer 100 is in a low-power state (e.g., the CPU 126 is powered off), a first audio signal via operation of the audio sensor 104. The power management processing unit 120 is be configured to verify the first audio signal based on an audio signal key by operation of the audio key detection logic 122. The power management processing unit 120 is configured to provide instructions for switching the computer 100 from the low-power state to a high-power state (e.g., the CPU 126 being powered on) in response to verifying the first audio signal. The instructions may be provided to the power controller 124 or to the CPU 126. The power management processing unit 120 may also be configured to provide instructions to the software memory 130 to activate a voice command interface 132 in response to verifying the first audio signal.

The audio key detection logic 122 includes logic to verify the first audio signal based on the audio signal key. The audio signal key may represent user-defined audio signal (e.g., the user saying one or more words in a natural language in his/her own voice). For example, the audio signal key may represent the user saying the word "computer," "phone," or "abracadabra." Alternatively, the audio signal key may alternatively include one or more words in a natural language spoken in any voice, not necessarily a specific voice. However, an audio signal spoken in any voice may be less secure than an audio signal spoken in a specific voice. Alternatively, the audio signal key may represent a tone produced by a device different from the computer 100, for example, a specific bell or a car horn. The audio signal key may correspond to a specific set of sound waves. For example, if the audio signal key corresponds to the user saying "computer," the audio key detection logic 122 may recognize the user saying "computer" as a valid key, but the audio key detection logic 122 may not recognize another person saying "computer" or a user saying a word different from "computer" as being the key. The user provides affirmatively provides permission for the computer 100 to store the recording of his/her voice in conjunction with the audio key detection logic. The user may, at any time, change his/her mind and cause the computer 100 to delete the recording of the user's voice stored in conjunction with the audio key detection logic.

In other example aspect, the power management processing unit 120 is configured to receive, while the computer 100 is in a low-power state, a motion signal detected via the motion sensor 106. The motion signal may correspond to, for example, a user entering a room where the computer 100 is located. The power management processing unit 120 is also configured to provide instructions (e.g., to the power controller 124) for switching the computer 100 from the low-power state to a high-power state (e.g., powering on the CPU 126) in response to the motion signal. Advantageously, in the example aspect described above, the computer 100 may enter the high-power state immediately when the user enters the room and the user may not need to press any buttons on the computer 100 in order to "wake up" the computer 100.

In additional example aspects, the power management processing unit 120 is configured to receive, while the computer 100 is in a low-power state, a button press signal detected via the button press sensor 102. The power management processing unit 120 is also configured to provide instructions (e.g., to the power controller 124) for switching the computer 100 from the low-power state to a high-power state (e.g., powering on the CPU 126) in response to the button press signal.

Three different possible operations of the power management processing unit 120 are described above. However, the subject technology may be implemented in conjunction with any one of the three operations of the power management processing unit. For example, a power management processing unit 120 in a mobile phone may be configured to cause the mobile phone to enter a high-power state in response to a button press signal or an audio signal, but not in response to a motion signal. A mobile phone may, oftentimes, be in a state of motion when it would be desirable for the mobile phone to remain in the low-power state, for example, while the mobile phone is in a pocket or a purse of a person who is walking. Alternatively, a desktop computer that lacks an audio sensor 104 may be configured to enter a high-power state in response to a detected movement or a detected button press.

The power controller 124 is configured to provide or deny power to processor(s) in the computer 100. For example, upon receiving instructions to power off the computer, the power controller 124 may deny power to the power management processing unit 120 and the CPU 126. Upon receiving instructions to enter a low-power state, the power controller 124 may deny power to the CPU 126 while providing power to the power management processing unit 120. Upon receiving instructions to enter a high-power state, the power controller 124 may provide power to both the power management processing unit 120 and the CPU 126.

Advantageously, the power management processing unit 120 may consume less power than the CPU 126. In example aspects, the power management processing unit 120 consumes 100-200 milliwatts, while the CPU 126 consumes 2-3 watts. As a result, a computer 100 with a limited power supply (e.g., a mobile phone or a laptop computer running on a battery) may be able to last longer in the low-power state than in the high-power state. The computer 100 may enter the high-power state when the user request to run software on the computer 100 or software is otherwise executed on the computer (e.g., upon receiving a call, a mobile device may enter a high-power state to play a ringtone absent a request from the user to run software on the mobile device).

The CPU 126 includes one or more processors. The CPU 126 is configured to carry out instructions in programs stored in the software memory 130.

The computer 100 may include one or multiple peripheral processing units (e.g., power management processing unit 120) in addition to the CPU 126. For example, the computer 100 (e.g., a smart phone) may include one or more of a power management controller, an audio digital signal processor, a camera system processor, a radio frequency baseband processor, a WiFi processor, or a graphic accelerator processor, each of which may operate independently of the others, and each of which may assist the CPU 126 in performing tasks. Any of the peripheral processing units above may perform all or part of the functions of the power management processing unit 120 described above, for example, to cause the CPU 126 to enter the high-power state. Any of the peripheral processing units above may require a lower power level than the CPU 126. In one example, a voice command is used to cause the computer 100 to transition from the low-power state to the high-power state. The peripheral processing unit that is used to cause the transition may be the audio digital signal processor. The audio digital signal processor may be coupled with the audio sensor 104 (e.g., microphone) or the audio sensor driver 114. The audio digital signal processor may be configured to process voice inputs (e.g., spoken words or phrases) to identify the audio key when the computer 100 is in the low-power state.

The bus 128 is configured to transmit data or instructions between components within the computer 100, for example, between the CPU 126, the software memory 130, and the system memory 110.

The software memory 130 is configured to store data or instructions, for example, data or instructions associated with software programs. The software memory 130 may include one or more of a cache unit, a storage unit, an internal memory unit, or an external memory unit. As illustrated, the software memory 130 includes a voice command interface 132 and an audio key setup module 134.

The voice command interface 132 is configured to receive a voice command and to execute software applications responsive to the voice command. For example, a user of the computer 100 may, upon instantiating the voice command interface 132, say the words, "Open the web browser and go to First-Social-Network.com." In response, the voice command interface 132 may cause the computer 100 to open the web browser and display the First-Social-Network.com webpage via the web browser.

The audio key setup module 134 is configured to receive an input of an audio key for placing the computer 100 in a high-power state and to store the audio key in conjunction with the audio key detection logic 122. The audio key may be spoken by the user once or multiple times to detect minor differences in the user's voice. The audio key may be played back to the user for verification by the user of the audio key. The user affirmatively provides permission for the computer 100 to record and store a recording of the user's voice for creating an audio key for the computer. The user may change his/her mind and cause the audio key including the recording of his/her voice to be removed from the computer 100 at any time.

The software memory 130 may include additional software programs, for example, one or more of a web browser, a word processing program, mobile phone application, a tablet computer application, etc.

Figure 2:
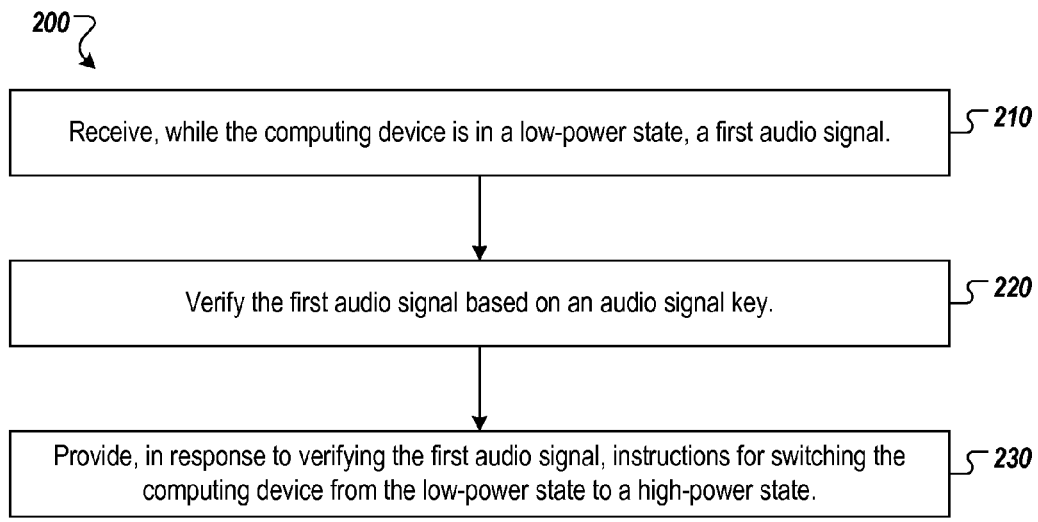
FIG. 2 illustrates an example process by which a computing device may switch from a low-power state to a high-power state in response to an audio signal.

FIG. 2 illustrates an example process 200 by which a computing device may switch from a low-power state to a high-power state in response to an audio signal.

The process 200 begins at step 210, where the power management processing unit (e.g, power management processing unit 120) of the computing device (e.g., computer 100) receives, while the computing device is in a low-power state, a first audio signal.

The power management processing unit may receive the first audio signal via input logic (e.g., one or more wires) coupled to an audio sensor (e.g., audio sensor 104) of the computing device.

The first audio signal may correspond to any sound in the environment of an audio sensor coupled with the computing device. For example, the first audio signal may include speech by the user, a tone being played, or a playback of a recording.

The low-power state may correspond to a sleep mode of the computing device, and a high-power state may correspond to an awake mode of the computing device. The computing device may also have an off mode, different from the sleep mode and the awake mode. In the off mode, the power management processing unit of the computing device may be powered off. In the awake mode and in the sleep mode, the power management processing unit of the computing device may be powered on.

The low-power state may correspond to one or more processors external to the power management processing unit being powered off, and the high-power state may correspond to the one or more processors external to the power management processing unit being powered on. The one or more processors external to the power management processing unit may be one or more of: all of the processors in the central processing unit (CPU), a portion of the processors in the CPU, all of the processors in a graphics processing unit (GPU), or a portion of the processors in the GPU.

The low-power state may correspond to a display (e.g., a screen) of the computing device being powered off, and the high-power state may correspond to the display of the computing device being powered on. The low-power state may correspond to a user interface for executing one or more software programs of the computing device being locked or inaccessible, and the high-power state may correspond to the user interface of the computing device being unlocked or accessible. The user interface may be for executing one or more software programs on the computing device. The one or more software programs may include mobile phone applications or tablet computer applications.

The low-power state may correspond to a voice command interface (e.g., voice command interface 132) of the client computing device being disabled, and the high-power state may correspond to the voice command interface of the client computing device being enabled.

In step 220, the power management processing unit verifies the first audio signal based on an audio signal key.

The power management processing unit may use verification logic (e.g., audio key detection logic 122) to verify the first audio signal based on the audio signal key. The verification logic may be hard-coded on the power management processing unit, as the software memory may be powered off or inaccessible during the low-power state of the computing device.

The power management processing unit may verify that the first audio signal corresponds (i.e., exactly matches or approximately matches) to a stored audio signal key. As used herein, the phrase "approximately matches" encompasses its plain and ordinary meaning including, but not limited to, matches while allowing for an amount of error typical in human speech. For example, an audio signal key corresponding to the word "computer" spoken in the user's voice at a first time may approximately match the word "computer" spoken in the user's voice at a second time, different from the first time. However, the audio signal may not approximately match a different word (e.g., "phone") spoken by the user or the word "computer" spoken by a person different from the user who has a voice that is different from the user's voice.

The audio signal key may be a user-defined audio signal key. For example, the audio signal key may be a representation of one or more words (e.g., words in a natural language) spoken in a specified voice, for example, the user's voice. Example words may be "computer," "phone," "abracadabra," "Fred," or "Cindy." The audio signal key may correspond to a specific sound wave input. As a result, the word "Fred," spoken in the user's voice may correspond to the user-defined audio signal key, while the word "Fred," spoken in a voice of a person other than the user may not correspond to the user-defined audio signal key. Alternatively, the audio signal key may correspond to a tone played by a device (e.g., a bell or a whistle) owned by the user. In another alternative, the audio signal key may correspond to a recorded sound saved on a device different from the computing device. For example, if the computing device is a desktop computer, the user could use a recorded sound saved on his/her mobile phone to cause the desktop computer to enter a high-power state.

In step 230, the power management processing unit provides, in response to verifying the first audio signal, instructions for switching the computing device from the low-power state to the high-power state.

The instructions may be provided via output logic (e.g., one or more wires) on the power management processing unit. The instructions may be provided to one or more of the power controller (e.g., power controller 124) of the computing device, the CPU (e.g., CPU 126) of the computing device, or the software memory (e.g., software memory 130) of the computing device) via the output logic. The power management processing unit may include a single output logic unit or multiple output logic units. The output logic unit(s) may connect the power management processing unit with the power controller, the CPU, and/or the software memory.

The instructions for switching the computing device from the low-power state to the high-power state may include one or more of: instructions for powering on the CPU of the computing device transmitted, for example, to the power controller or to the CPU, instructions for powering on the GPU of the computing device transmitted, for example, to the power controller or to the GPU, instructions for powering on the display of the computing device transmitted, for example, to the power controller, instructions for unlocking a user interface for executing one or more applications on the computing device transmitted, for example, to the software memory, instructions for instantiating a voice command interface (e.g., voice command interface 132) of the computing device transmitted, for example, to the software memory, or instructions for authenticating the user of the computing device transmitted, for example, to the software memory.

The computing device may authenticate the user based on the first audio signal. For example, a computing device with multiple users may store multiple audio signal keys, one for each user. Upon authenticating the user, the computing device may adjust settings on the computing device based on the authenticated user. For example, the computing device may log into the user's electronic messaging (e.g., email) account or adjust default screen brightness or audio volume settings according to preferences previously entered by the user.

In a computing device with a single user (e.g., a mobile phone), the computing device may authenticate the user of the mobile phone based on the first audio signal. The authentication may correspond to a form of password protecting the mobile phone as the primary user of the mobile phone may be able to authenticate him/herself as the primary user (using his/her voice), while another person (e.g., someone other than the primary user trying to access the primary user's data on the mobile phone) may be unable to authenticate him/herself as the primary user. After step 230, the process 200 ends.

Advantageously, in some implementations of the subject technology, a user of a computing device may be able to say a phrase corresponding to the audio signal key, for example, "Phone," while the computing device is in a sleep mode, followed by a command for the voice command interface, e.g., "Call Mom." Upon detecting the audio signal key ("Phone"), the computing device may enter the awake mode and instantiate the voice command interface. The voice command interface may then process the command "Call Mom," to call a telephone number associated with "Mom" in the telephone directory of the computing device. In other words, in response to detecting the phrase, "Phone, call Mom," while the computing device is in sleep mode, the computing device may enter the awake mode and call Mom. The user may not need to press any buttons to cause the computing device to call Mom, facilitating interaction of the user with the computing device when the user's hands or eyes are unavailable to search for the button (e.g., when the user is driving). Other commands that the user could initiate when the computing device is in sleep mode may include: "Phone, open the web browser," "Phone, open the XYZ Bank application," or "Phone, open the web browser and go to first-social-network.com."

The steps 210-230 in the process 200 may be carried out in series. Alternatively, two or more of the steps 210-230 in the process 200 may be carried out in parallel.

Figure 3:
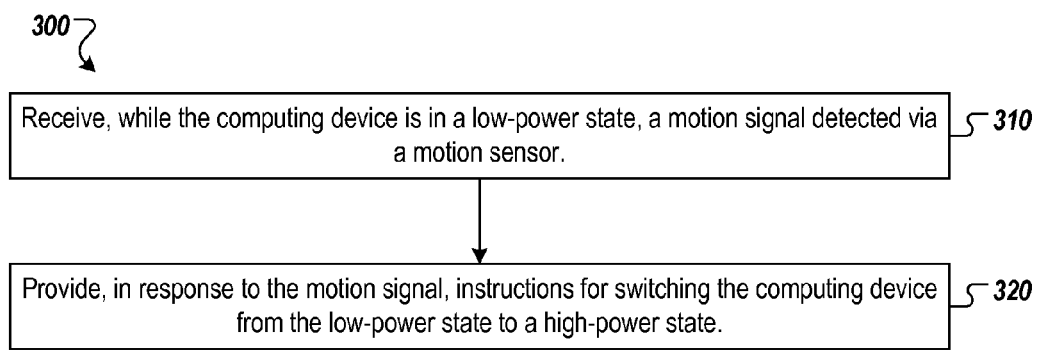
FIG. 3 illustrates an example process by which a computing device may switch from a low-power state to a high-power state in response to a motion signal.

FIG. 3 illustrates an example process 300 by which a computing device may switch from a low-power state to a high-power state in response to a motion signal.

The process 300 begins at step 310, where a power management processing unit (e.g., power management processing unit 120) of a computing device (e.g., computer 100) receives, while the computing device is in a low-power state (e.g., a sleep mode), a motion signal detected via a motion sensor (e.g., motion sensor 106). The motion sensor may reside within the computing device or be coupled to the computing device (e.g., via a wired connection). The power management processing unit may receive the motion signal via input logic (e.g., one or more wires).

In step 320, the power management processing unit provides, in response to the motion signal, instructions for switching the computing device from the low-power state to a high-power state (e.g., an awake mode). The power management processing unit may provide the instructions via one or more output logic units (e.g., one or more wires) that connect the power management processing unit to one or more of a power controller, a CPU, or a software memory of the computing device.

Switching the computing device from the low-power state to the high-power state may include, for example, providing a user interface for executing one or more software programs (e.g., a web browser, a word processing program, a voice command interface, etc.) on the computing device or instantiating the voice command interface of the computing device.

The power controller may be for providing power to processors in the computing device. One or more of the processors in the computing device that are powered by the power controller may correspond to the CPU of the computing device. One or more of the processors in the computing device that are powered by the power controller may correspond to the power management processing unit of the computing device. The power controller may also be for powering a display (e.g., a screen) of the computing device. Upon receiving appropriate instructions, the power controller may provide or deny power to any processors in the computing device or to the screen. After step 320, the process 300 ends.

Advantageously, in some implementations of the subject technology, a user may be able to enter a room where the computing device is located. In response the computing device may enter a high-power state, due to the motion detector detecting the user's movement. The computing device may instantiate the voice command interface allowing the user to say a voice command. Accordingly, a user may be able to walk into a room where the computing device is located and say the voice commands, "Open the web browser and go to pqr-newspaper.com," "Open the document patent-application with the word processor," or "Instantiate the email client and compose a message with the subject 'Hello' to jane-abc@def-corporation.com" and have the computer respond to the voice commands (by operation of the voice command interface), where the computing device is in a low-power state, and the voice command interface is not instantiated, immediately prior to the user entering the room and the user does not press any buttons on the computing device.

The steps 310-320 in the process 300 may be carried out in series. Alternatively, two or more of the steps 310-320 in the process 300 may be carried out in parallel.

Figure 4:
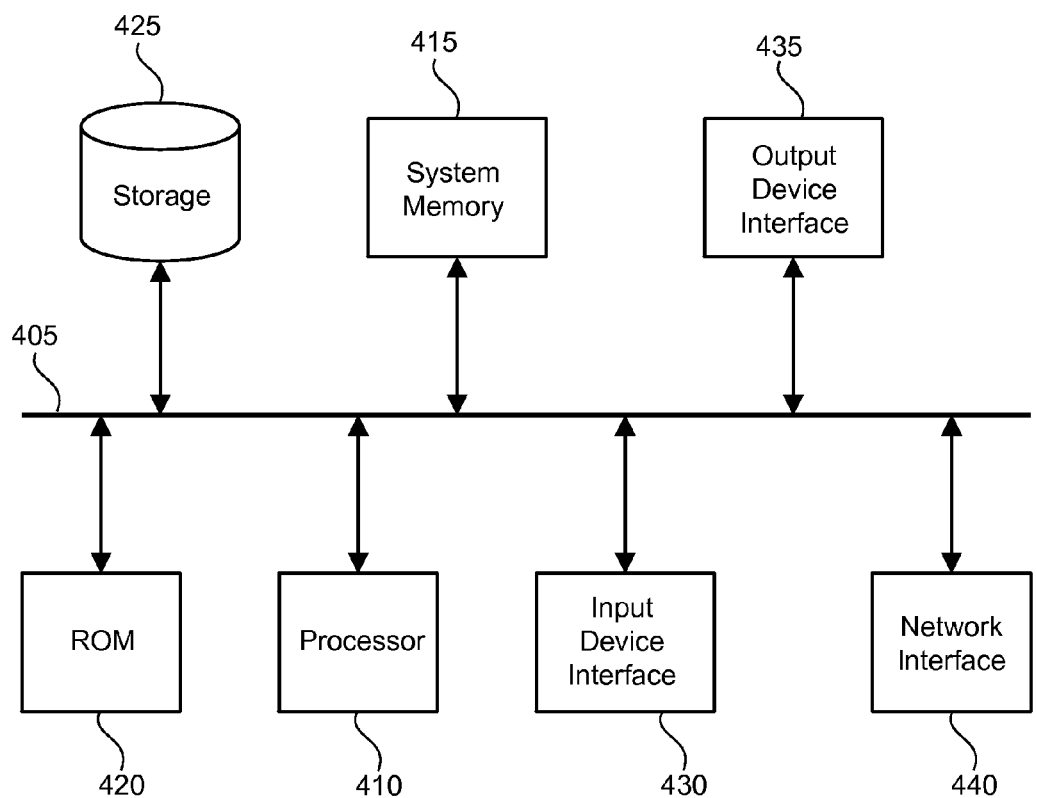
FIG. 4 conceptually illustrates an example electronic system with which some implementations of the subject technology are implemented.

FIG. 4 conceptually illustrates an electronic system 400 with which some implementations of the subject technology are implemented. For example, the computer 100 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for switching a computing device from a low-power state to a high-power state in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method, implemented on a power management processing unit of a computing device, for switching the computing device from a low-power state to a high-power state, the method comprising:
    receiving, at the power management processing unit distinct from a central processing unit, while the central processing unit of the computing device is in the low-power state, a first audio signal;
    verifying, by the power management processing unit using audio key detection logic hard-coded within the power management processing unit, that the first audio signal approximately matches one of multiple stored audio signal keys, the audio signal keys being based on voice recordings of multiple users of the computing device;
    authenticating one of the multiple users based on the matched audio signal key;
    providing, by the power management processing unit in response to verifying the first audio signal, instructions for:
        switching the central processing unit of the computing device from the low-power state to the high-power state;
        instantiating a voice command interface; and
        providing the first audio signal to the voice command interface to process a voice command from the first audio signal.

2. The method of claim 1, wherein the audio signal key comprises a user-defined audio signal key.

3. The method of claim 1, wherein the low-power state comprises a sleep mode.

4. The method of claim 3, wherein the instructions for switching the central processing unit of the computing device from the low-power state to the high-power state comprise instructions for powering on the central processing unit of the computing device.

5. The method of claim 1, wherein the instructions for switching the computing device from the low-power state to the high-power state comprise instructions for powering on display of the computing device.

6. The method of claim 1, wherein the low-power state comprises a locked state which prevents access to a user interface for executing one or more software programs and the high-power state comprises an unlocked state which allows access to a user interface for executing one or more software programs.

7. The method of claim 1, wherein the low-power state comprises the voice command interface of the computing device being disabled.

8. The method of claim 1, further comprising receiving, at the power management processing unit, a motion signal, wherein the instructions for switching the central processing unit of the computing device from the low-power state to the high-power state is not provided by the power management processing unit in response to the motion signal.

9. The method of claim 1, wherein the voice recordings of the multiple users are based on each user speaking an audio signal key one or more times.

10. The method of claim 1, further comprising adjusting settings on the computing device based on the authenticated user.

11. A power management processing unit of a computing device configured to switch the computing device from a low-power state to a high-power state, the power management processing unit comprising:
    input logic for receiving, while one or more processors external to the power management processing unit are powered off, a first audio signal;
    verification logic, hard-coded in the power management processing unit, for verifying that the first audio signal approximately matches one of multiple stored audio signal keys residing within the power management processing unit, the audio signal keys being based on voice recordings of multiple users of the computing device;
    output logic for providing, in response to verifying the first audio signal, to a power controller of the computing device, instructions for powering on the one or more processors external to the power management processing unit; and
    second output logic for providing, to a software memory of the computing device, instructions for authenticating one of the multiple users based on the matched audio signal key, instantiating a voice command interface of the client computing device in response to verifying the first audio signal, and instructions for providing the first audio signal to the voice command interface to process a voice command from the first audio signal.

12. The power management processing unit of claim 11, wherein the one or more processors external to the power management processing unit comprise a central processing unit of the computing device.

13. The power management processing unit of claim 11, wherein a central processing unit of the computing device comprises the one or more processors external to the power management processing unit.

14. The power management processing unit of claim 11, wherein the audio signal key comprises a user-defined audio signal key.

15. The power management processing unit of claim 11, further comprising:
    second output logic for providing, to a software memory of the client computing device, instructions for unlocking a user interface for executing one or more software programs on the computing device in response to verifying the first audio signal.

16. The power management processing unit of claim 11, wherein the output logic is further for providing, to the power controller of the computing device, instructions for powering on a display of the computing device, in response to verifying the first audio signal.

17. The power management processing unit of claim 11, wherein the display is powered off immediately prior to receiving the first audio signal.

18. The power management processing unit of claim 11, further comprising second input logic for receiving, while the one or more processors external to the power management processing unit are powered off, a motion signal,
    wherein the output logic is not configured to provide, in response to the motion signal, the instructions for powering on the one or more processors external to the power management processing unit.

19. The power management processing unit of claim 11, wherein the voice recordings of the multiple users are based on each user speaking an audio signal key one or more times.

20. The power management processing unit of claim 11, wherein the second output logic is further for providing instructions to adjust settings on the computing device based on the authenticated user.

* * * * *